United States Patent [19]

Suzuki

[11] Patent Number: 6,088,406
[45] Date of Patent: Jul. 11, 2000

[54] RECEPTION METHOD, RECEPTION APPARATUS AND TIMING DETECTING APPARATUS

[75] Inventor: Mitsuhiro Suzuki, Chiba, Japan

[73] Assignee: Sony Corporation, Tokyo, Japan

[21] Appl. No.: 08/915,384

[22] Filed: Aug. 20, 1997

[30] Foreign Application Priority Data

Aug. 23, 1996 [JP] Japan .................................. 8-222932

[51] Int. Cl.$^7$ ....................................................... H04L 7/02
[52] U.S. Cl. .......................... 375/343; 375/132; 375/138; 375/149; 375/362; 375/364
[58] Field of Search ..................................... 375/326, 340, 375/343, 354, 362, 364, 132, 134, 137, 138, 145, 149

[56] References Cited

U.S. PATENT DOCUMENTS

| 5,214,675 | 5/1993 | Mueller et al. ........................ 375/340 |
| 5,541,552 | 7/1996 | Suzuki et al. ........................... 329/307 |
| 5,862,186 | 1/1999 | Kumar ..................................... 375/324 |

*Primary Examiner*—Young T. Tse
*Attorney, Agent, or Firm*—Jay H. Maioli

[57] ABSTRACT

A receiving method for receiving, demodulating and decoding a signal with synchronizing a multicarrier signal having guard times each having the same waveform, includes a correlation detecting step of detecting correlation of a demodulated signal in the time domain, a mean value calculating step of calculating a mean value of a correlated value detected in the correlation detecting step, an accumulating step of accumulating the mean value, a peak detecting step of detecting a peak value of an accumulated value obtained in the accumulating step, a synchronization signal generating step of generating a synchronization signal by using an output signal in the peak detecting step, and a decoding step of decoding a signal by using the synchronization signal.

22 Claims, 13 Drawing Sheets

RECEPTION METHOD, RECEPTION APPARATUS AND TIMING DETECTING APPARATUS

BACKGROUND OF THE INVENTION

1. Field of the Invention

The present invention relates to a reception method and a reception apparatus suitable for application to reception of a multicarrier signal in the form of burst data, for example, and a timing detecting apparatus applied to the above reception.

2. Description of the Related Art

Various radio telephone systems have been put into practice. Communication systems which have been applied to a radio telephone system are basically the same as a communication system for communicating between fixed stations.

A reception signal received by a portable communication terminal such as an automobile telephone, a portable telephone or the like is easily distorted because of multipath fading. Specifically, the multipath fading largely delays transmission of a signal among respective paths, and intersymbol interference is caused to thereby overlap codes located adjacent to each other. Therefore, a transmission characteristic is degraded.

In order to satisfactorily receive a signal even in case of such degradation of the transmission characteristic, it is necessary to employ a synchronous detecting circuit having a complicated arrangement formed of an adaptive equalizer and a phase-locked loop (PLL) circuit, which complicates an arrangement of a receiver and increases manufacturing costs thereof.

In order to solve the above problem, the assignee of the present invention has proposed a communication system for transmitting information by using phase difference between respective carriers in a so-called multicarrier system in which a plurality of carriers are simultaneously transmitted (in Japanese patent application No. 216311/1996 and so on).

In a communication system employing such multicarrier system, it is difficult to carry out a precise timing processing. Specifically, it is difficult to precisely synchronize a timing used for demodulating a reception carrier at every one modulation unit time of a transmitted signal, and hence the demodulation timing tends to be offset. If the demodulation timing is offset, an error depending upon a carrier frequency occurs in a demodulated phase information, which increases a determination error rate. If the synchronization data is added to the transmission data in order to keep the demodulation timing, then an amount of information which can be transmitted is reduced to that extent, which lowers a transmission efficiency.

SUMMARY OF THE INVENTION

In view of such aspects, it is an object of the present invention to provide a communication method and a communication apparatus which can suppress interference of communication of adjacent cells to a minimum when a one-cell repetition system is applied.

According to an aspect of the present invention, a receiving method for receiving, demodulating and decoding a signal with synchronizing a multicarrier signal having guard times each having the same waveform, includes a correlation detecting step of detecting correlation of a demodulated signal in the time domain, a mean value calculating step of calculating a mean value of a correlated value detected in said correlation detecting step, an accumulating step of accumulating said mean value, a peak detecting step of detecting a peak value of an accumulated value obtained in said accumulating step, a synchronization signal generating step of generating a synchronization signal by using an output signal in said peak detecting step, and a decoding step of decoding a signal by using said synchronization signal.

DESCRIPTION OF THE PREFERRED EMBODIMENTS

A communication method and a communication apparatus according to an embodiment of the present invention will hereinafter be described with reference to FIG. 1 to FIG. 13.

Initially, a communication system to which the present embodiment is applied will be described. The communication system of the present embodiment is arranged as a so-called multicarrier system in which a plurality of subcarriers are continuously disposed within a band allocated in advance, and the plurality of subcarriers within the single band are utilized on a single transmission path at the same time. Further, the plurality of subcarriers within the single band are collectively divided in the band to be modulated. Here, this system is called a band division multiple access (BDMA: Band Division Multiple Access).

Figure 1:
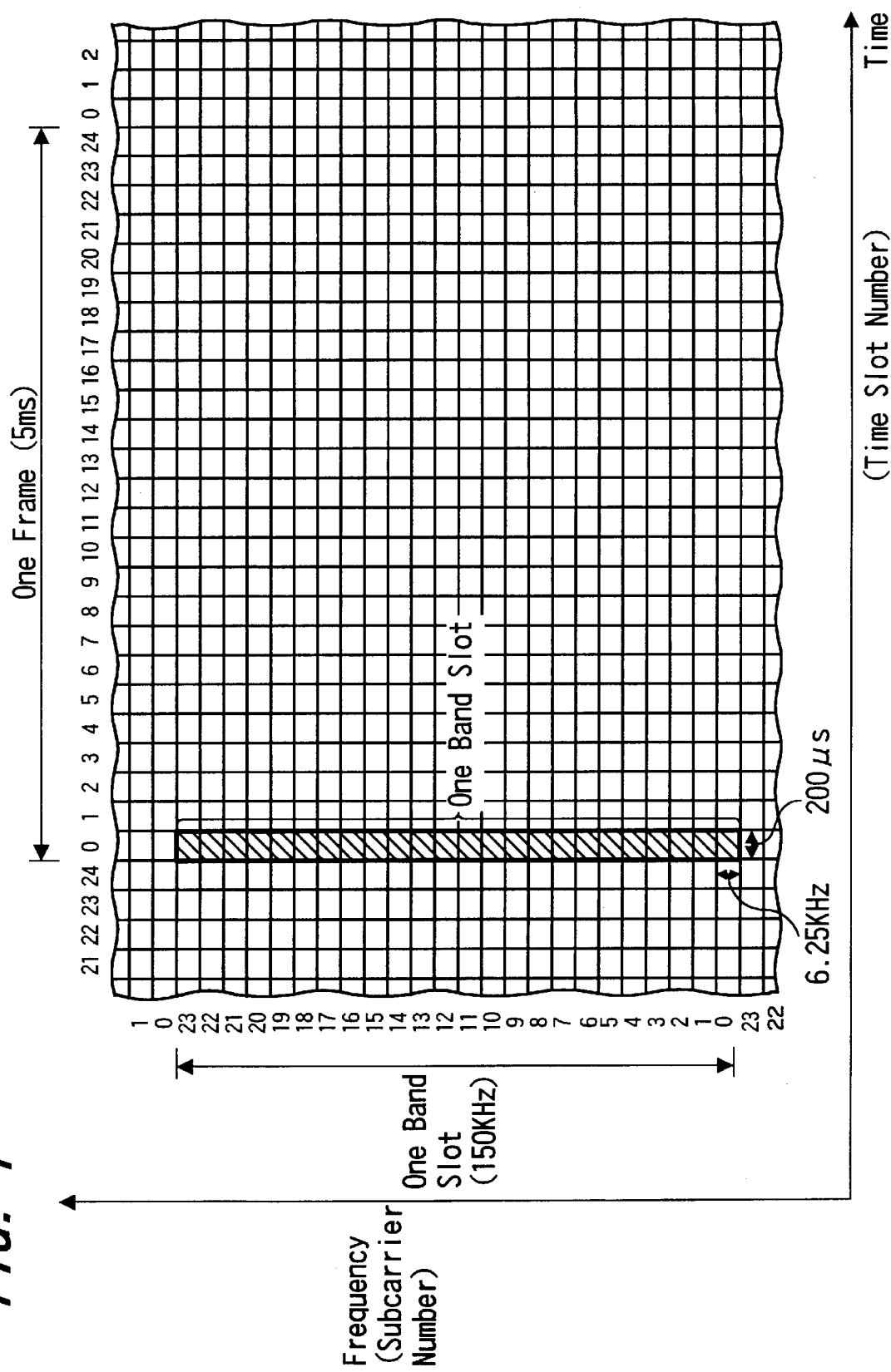
FIG. 1 is a diagram used to explain a slot arrangement of a transmission signal used in a communication apparatus according to an embodiment of the present invention.
Figure 2:
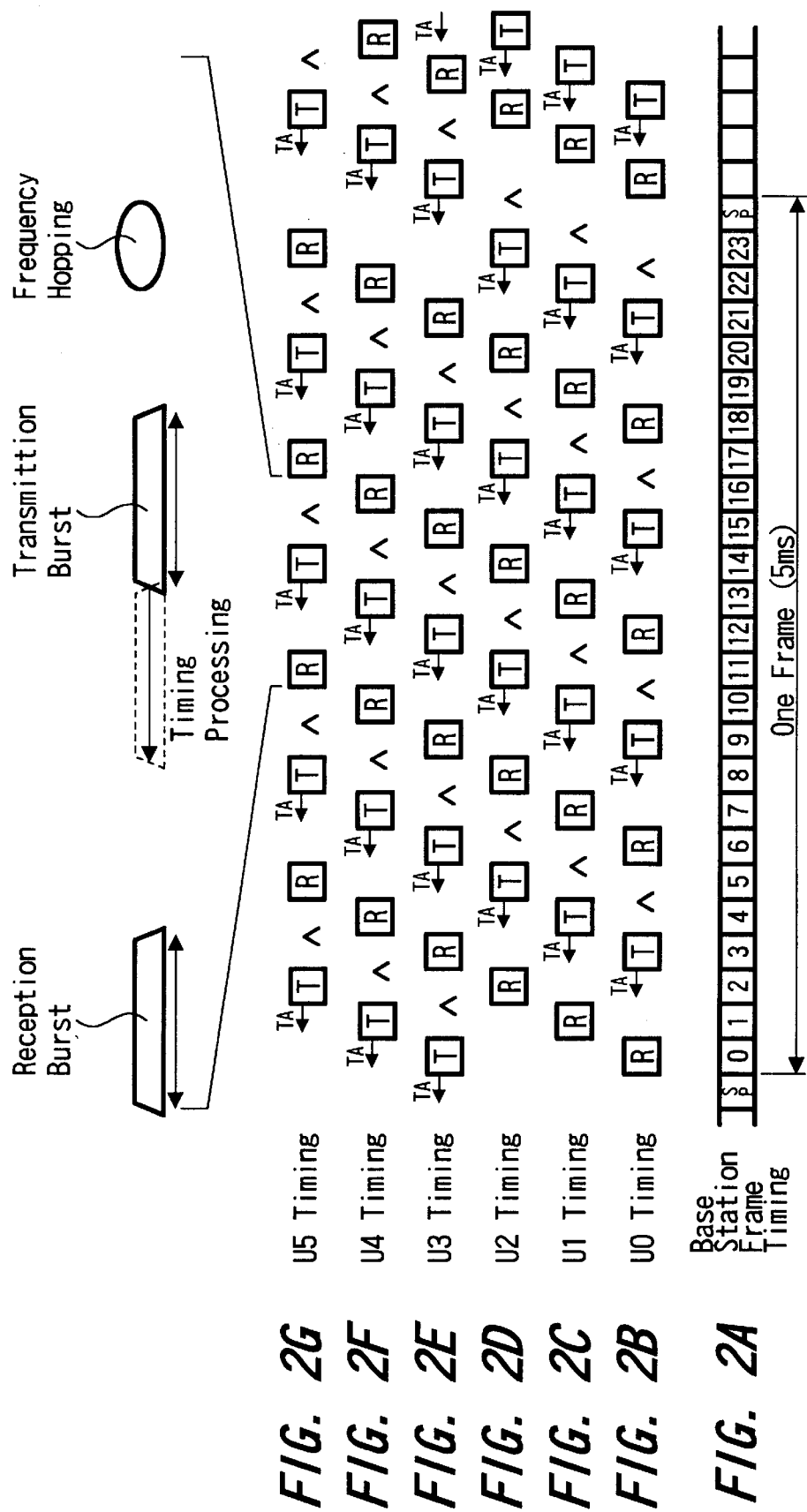
FIGS. 2A to 2G are diagrams each used to explain a transmission state in a frame according to the embodiment.

The arrangement thereof will be described below. FIG. 1 is a diagram showing a slot arrangement of transmission signals of the present embodiment in which a frequency is set in the ordinate thereof and a time is expressed on the abscissa thereof. In the present example, the frequency-axis and the time-axis are divided in a lattice fashion to provide an orthogonal base system. Specifically, the transmission band width of one transmission band (one band slot) is set to 150 KHz and the one transmission band of the 150 KHz includes therein twenty-four subcarriers. The twenty-four subcarriers are disposed continuously with an equal interval of 6.25 KHz, and every carrier is assigned with a subcarrier number from 0 to 23. However, practically existing subcarriers are allocated to bands of subcarrier numbers of 1 to 22. Bands of both end portions of the one band slot, i.e., bands of subcarrier numbers of 0 and 23 are assigned with no subcarrier, i.e., they are made to serve as a guard band and their electric power is set to zero.

One time slot is regulated at an interval of 200 $\mu$sec in terms of the time-axis. A burst signal is modulated and transmitted together with 22 subcarriers at every time slot. One frame is defined as an array of 25 time slots (i.e., 5 msec.). Each of the time slots within one frame is assigned with a time slot number from 0 to 24. A hatched area in FIG. 1 represents a section of one time slot in one band slot. In this case, a time slot assigned with a slot number of 24 is a period in which no data is transmitted.

Multiple access in which a plurality of mobile stations (terminal apparatus) carry out communication with a base station at the same period, is carried out by using the orthogonal base system which derives from dividing the frequency-axis and time-axis in a lattice fashion. Connection condition with respective mobile stations is arranged as shown in FIGS. 2A to 2G. FIGS. 2A to 2G are diagrams each showing an operation condition indicating how six mobile stations are connected to the base station by using time slots U0, U1, U2, . . . , U5 with one band slot (actually utilized band slot is changed owing to a frequency hopping which will be described later). A time slot represented by R is a reception slot while a time slot represented by T is a transmission slot. As shown in FIG. 2A, a frame timing regulated in the base station is set to a period including twenty-four time slots (of the twenty-five time slots, the last slot, i.e, a slot of number 24 is not utilized). In this case, the transmission slot is transmitted using a band different from one of the reception slot.

The mobile station U0 shown in FIG. 2B uses time slots of time slot numbers, 0, 6, 12, 18 within one frame as a reception slot, while time slots of time slot numbers, 3, 9, 15, 21 as a transmission slot. A burst signal is received or transmitted in each time slot. The mobile station U1 shown in FIG. 2C uses time slots of time slot numbers, 1, 7, 13, 19 within one frame as a reception slot, while time slots of time slot numbers, 4, 10, 16, 22 as a transmission slot. The mobile station U2 shown in FIG. 2D uses time slots of time slot numbers, 2, 8, 14, 20 within one frame as a reception slot, while time slots of time slot numbers, 5, 11, 17, 23 as a transmission slot. The mobile station U3 shown in FIG. 2E uses time slots of time slot numbers, 3, 9, 15, 21 within one frame as a reception slot, while time slots of time slot numbers, 0, 6, 12, 28 as a transmission slot. The mobile station U4 shown in FIG. 2F uses time slots of time slot numbers, 4, 10, 16, 22 within one frame as a reception slot, while time slots of time slot numbers, 1, 7, 13, 22 as a transmission slot. Further, the mobile station U5 shown in FIG. 2G uses time slots of time slot numbers, 5, 11, 16, 22 within one frame as a reception slot, while time slots of time slot numbers, 2, 8, 14, 20 as a transmission slot.

Since the arrangement shown in FIGS. 2A to 2G is employed, six time-division multiple access (TDMA) in which six mobile stations accesses one band slot is carried out. In view of each of the mobile stations, there is a spare period of two time slots (i.e., 400 $\mu$sec.) from completion of reception or transmission of one time slot period to start of next transmission or reception. Each of the mobile stations carries out a timing processing and a processing called frequency hopping by utilizing this spare period. Specifically, each of the mobile stations carries out a timing processing TA for agreeing a transmission timing with a timing of a signal transmitted from a base station during after 200 $\mu$sec have passed before each transmission slot T, and carries out the frequency hopping for switching a band slot used for transmission and reception to another band slot after about 200 $\mu$sec have passed since completion of each transmission slot T. Since the above timing is one used when the transmission rate is set high, if the transmission rate is set low and the number of the band slot to be used is changed, then it is necessary to set the timing for the frequency hopping again. The frequency hopping permits a plurality of band slots prepared for one base station to be used by each of the mobile stations equally.

Specifically, a plurality of band slots are allocated to a single base station. In a case of a cellular system in which one base station forms one cell, if a band of 1.2 MHz is allocated to one cell, eight band slots can be allocated to one cell. Similarly, if a band of 2.4 MHz is allocated to one cell, sixteen band slots can be allocated to one cell; if a band of 4.8 MHz is allocated to one cell, thirty-two band slots can be allocated to one cell; and if a band of 9.6 MHz is allocated to one cell, sixty-four band slots can be allocated to one cell. Then, a frequency switching processing called the frequency hopping is carried out so that a plurality of band slots allocated to one cell are utilized uniformly. In the present example, a plurality of band slots of which frequencies are continuous are allocated to one cell.

Figure 3:
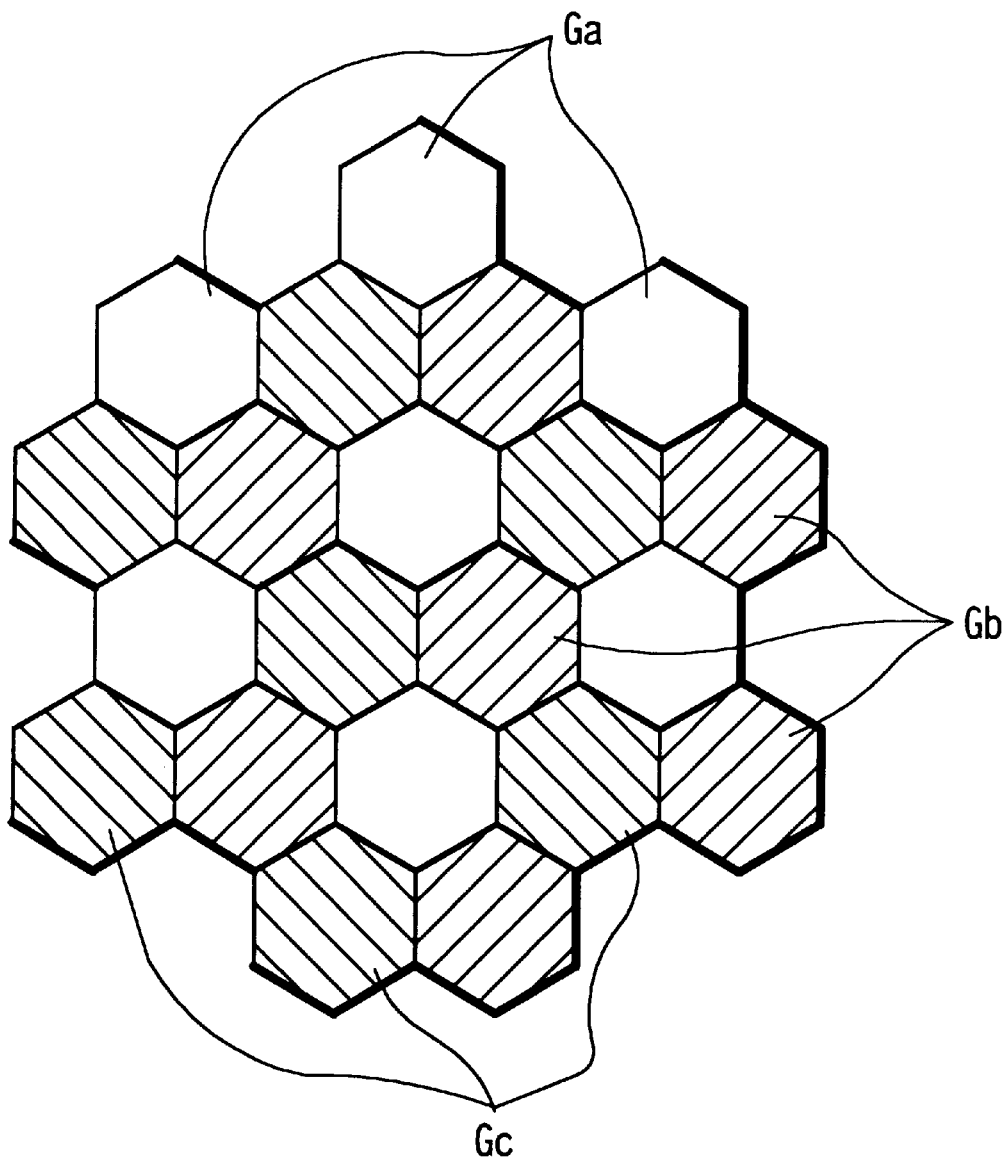
FIG. 3 is a diagram used to explain an example of a cell arrangement according to the embodiment.
Figures 4A, 4B, 4C:
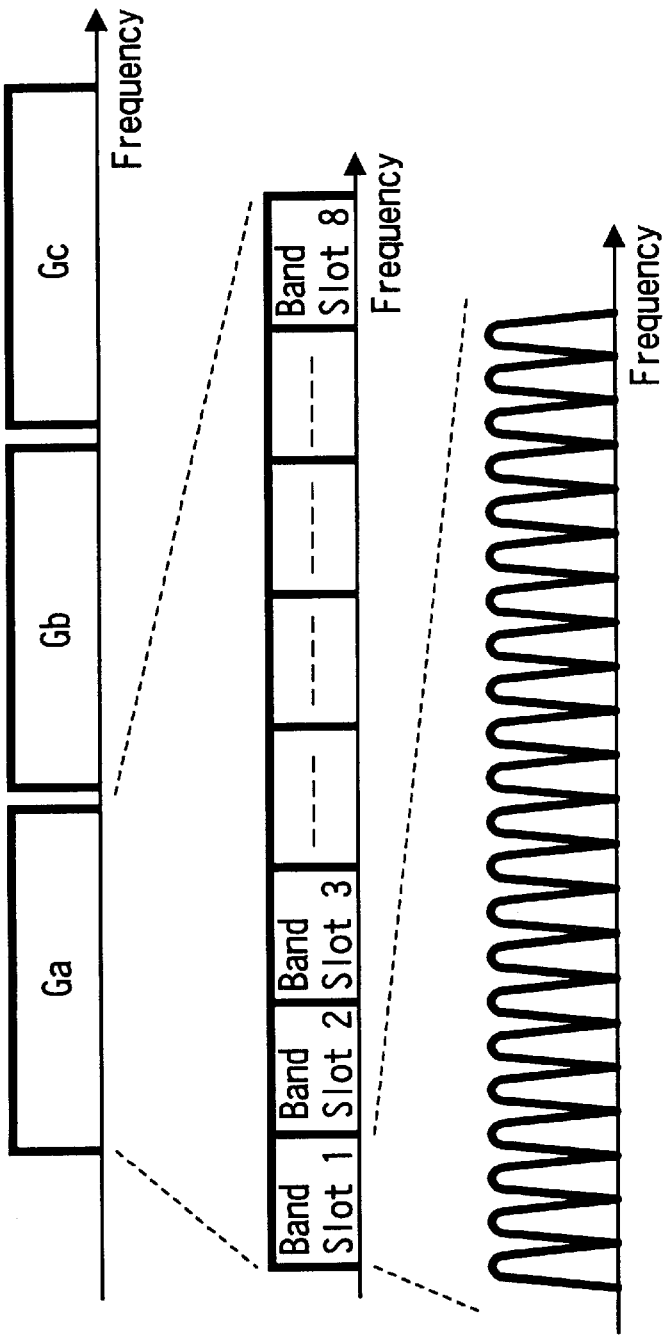
FIGS. 4A to 4C are diagrams each used to explain an example of a band slot arrangement according to the embodiment.

FIG. 3 shows an ideal layout of cells. If cells are arrayed in this manner, three kinds of frequencies are sufficient to allocate to all cells, i.e., a frequency is allocated to cells of a group Ga using a first band, another frequency is allocated to cells of a group Gb using a second band, still another frequency is allocated to cells of a group Gc using a third band. That is, if one cell uses eight band slots, as shown in FIGS. 4A and 4B, continuous eight band slots are prepared for the group Ga, the next continuous eight band slots are prepared for the group Gb and the next continuous eight band slots are prepared for the group Gc. In this case, as shown in FIG. 4C, each band slot includes twenty-two subcarriers, and a multicarrier transmission is carried out using the plurality of subcarriers at a time. As shown in FIGS. 2A to 2G, communication with a mobile station within the cell is carried out while carrying out the frequency hopping that band slots for multicarrier transmission are changed.

The communication condition is settled as above so that a signal transmitted between each mobile station and the base station is maintained to have an orthogonal property with respect to other signals. Therefore, the signal will not suffer from interference from other signals and only a corresponding signal can be extracted satisfactorily. Since a band slot utilized for transmission is changed at any time by the frequency hopping, the transmission bands prepared for each base station is effectively utilized, which leads to effective transmission. In this case, as described above, a frequency band to be allocated to one base station (cell) can be freely settled. Therefore, a system can be freely settled depending on a used situation.

Next, an arrangement of a terminal apparatus (mobile station) which carries out communication with the base station in the above-described system will be described. In this case, a band of 2.0 GHz is utilized as a down-link from the base station to the terminal apparatus while a band of 2.2 GHz is utilized as an up-link from the terminal apparatus to the base station.

Figure 5:
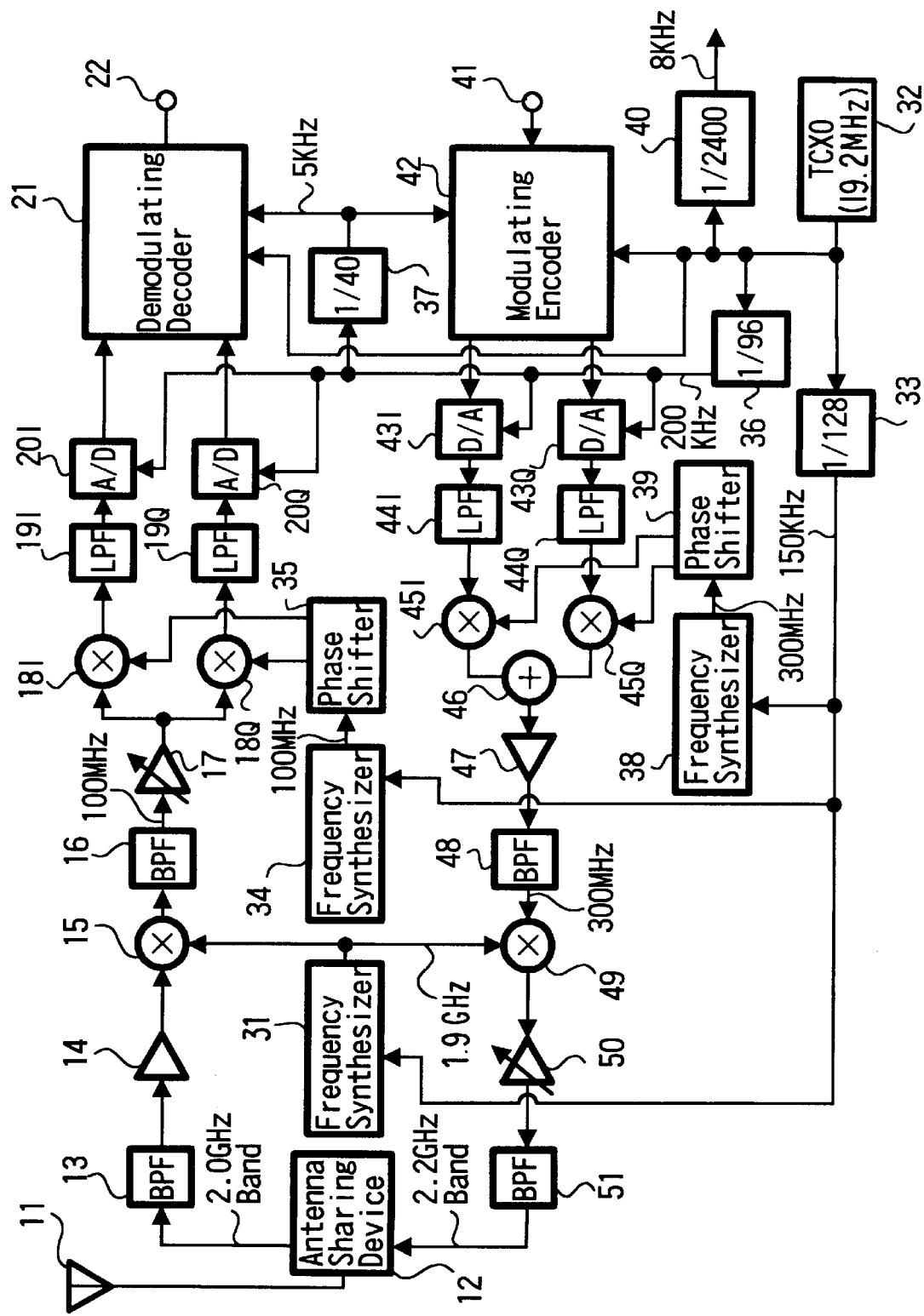
FIG. 5 is a block diagram showing an arrangement of a terminal apparatus according to an embodiment of the present invention.

FIG. 5 is a diagram showing an arrangement of the terminal apparatus. A reception system thereof will be described first. An antenna 11 serving for transmitting and receiving a signal is connected to an antenna sharing device 12. The antenna sharing device 12 is connected at its received signal output side with a band-pass filter 13, a reception amplifier 14 and a mixer 15 in series. The band-pass filter 13 extracts a signal of the 2.0 GHz band. The mixer 15 mixes the output from the band-pass filter with a frequency signal of 1.9 GHz output from a frequency synthesizer 31 so that the received signal is converted into an intermediate frequency signal of a 100 MHz. The frequency synthesizer 31 is formed of a PLL (phase-locked-loop circuit), and it is a synthesizer for generating signals in a band of 1.9 GHz with an interval of 150 kHz (i.e., one band slot interval) based on a signal of 150 kHz which is generated by frequency-dividing a signal of 19.2 MHz output from a temperature compensation type crystal oscillator (TCXO) 32 by a 1/128 frequency divider 33. Other frequency synthesizers, which will be described later on, utilized in the terminal apparatus are also formed of a PLL circuit.

The intermediate frequency signal output from the mixer 15 is supplied through a band-pass filter 16 and a variable gain amplifier 17 to two mixers 18I, 18Q useful for demodulation. A frequency signal of 100 MHz output from a frequency synthesizer 34 is supplied to a phase shifter 35 in which the signal is made into two system signals of which phases are shifted from each other by 90 degrees. One of the two-system frequency signals is supplied to the mixer 18I while the other of the same is supplied to the mixer 18Q so that they are mixed with the intermediate frequency signal respectively, whereby an I component and a Q component contained in the received data are extracted. The frequency synthesizer 34 is a synthesizer for generating a signal of 100 MHz band based on the signal of 150 kHz generated by frequency-dividing of the 1/128 frequency-divider 33.

Then, the extracted I-component is supplied through a low-pass filter 19I to an analog-to-digital converter 20I in which the component is converted into digital I data. The extracted Q-component is supplied through a low-pass filter 19Q to an analog-to-digital converter 20Q in which the component is converted into digital Q data. In this case, the respective analog-to-digital converters 20I, 20Q use a clock of 200 kHz as a clock for conversion which is generated by dividing a clock of 19.2 MHz output from the TCXO 32 by a 1/96 frequency divider 36.

Then, the digital I data and digital Q data output from the analog-to-digital converters 20I, 20Q are supplied to a demodulating decoder 21 in which demodulated reception data is obtained at a terminal 22. The demodulating decoder 21 is supplied with the clock of 19.2 MHz output from the TCXO 32 as a clock as it is, and also supplied with a clock of 5 kHz generated by frequency-dividing the clock of 200 kHz output from the 1/96 frequency divider 36 by a 1/40 frequency-divider 37. The clock of 5 kHz is utilized for generating slot timing date. Specifically, in the present example, one time slot is set to 200 μsec as described above. However, a signal of which frequency is 5 kHz has one period of 200 μsec. Thus, slot timing data is generated in synchronism with the signal of 5 kHz.

Next, the transmission system of the terminal apparatus will be described. Transmission data obtained at a terminal 41 is supplied to a modulating encoder 42 in which processing for encoding and modulation is carried out for transmission so as to generate digital I data and digital Q data for transmission. In this case, the modulating encoder 42 is supplied with the clock of 19.2 MHz as a clock which is output from the TCXO 32 as it is, and also supplied with the signal of 5 kHz generated by division with the 1/40 frequency-divider 37 as data for generating a slot timing. The digital I data and the digital Q data output from the modulating encoder 42 are supplied to digital-to-analog converters 43I and 43Q in which the data are converted into an analog I signal and an analog Q signal. The converted I signal and Q signal are supplied through low-pass filters 44I and 44Q to mixers 45I and 45Q. Further, a frequency signal of 300 MHz output from a frequency synthesizer 38 is converted by a phase shifter 39 into two system signals of which phases are shifted from each other by 90 degrees. One of the two system frequency signals is supplied to the mixer 45I while the other of the same is supplied to the mixer 45Q, whereby the frequency signals are mixed with the I signal and the Q signal, respectively, so as to form signals falling in a 300 MHz band. Both of the signals are supplied to an adder 46 in which carried out is an orthogonal modulation to unify them into a single system signal. The frequency synthesizer 38 is a synthesizer for generating a signal of 300 MHz band based on the signal of 150 kHz generated by a frequency-division with the 1/128 frequency-divider 33.

Then, the signal modulated into the signal of 300 MHz band output from the adder 46 is supplied through a transmission amplifier 47 and a band-pass filter 48 to a mixer 49, in which the signal is added with a frequency signal of 1.9 GHz output from the frequency synthesizer 31 so as to convert the signal into a signal of a transmission frequency of 2.2 GHz band. The transmission signal frequency-converted into the transmission frequency is supplied through a transmission amplifier (variable gain amplifier) 50 and a band-pass filter 51 to the antenna sharing device 12 so that the signal is transmitted from the antenna 11 connected to the antenna sharing device 12 in a wireless fashion. A gain of the transmission amplifier 50 is controlled to thereby adjust a transmission output. The control in transmission output is carried out based on output control data received from the base station side, for example.

Further, the signal of 19.2 MHz output from the TCXO 32 is supplied to a 1/2400 frequency-divider 40 to convert be converted into a signal of 8 kHz, and the signal of 8 kHz is supplied to a circuit of a speech processing system (not shown). That is, in the terminal apparatus of the present example, a speech signal transmitted between it and the base station is sampled at a rate of 8 kHz (or oversampling at a rate of an integral multiple of the frequency). Thus, the 1/2400 frequency divider 40 produces a clock necessary for speech data processing circuits such as an analog-to-digital converter and a digital-to-analog converter of a speech signal or a digital signal processor (DSP) for processing for compression and expansion on speech data and so on.

Figure 6:
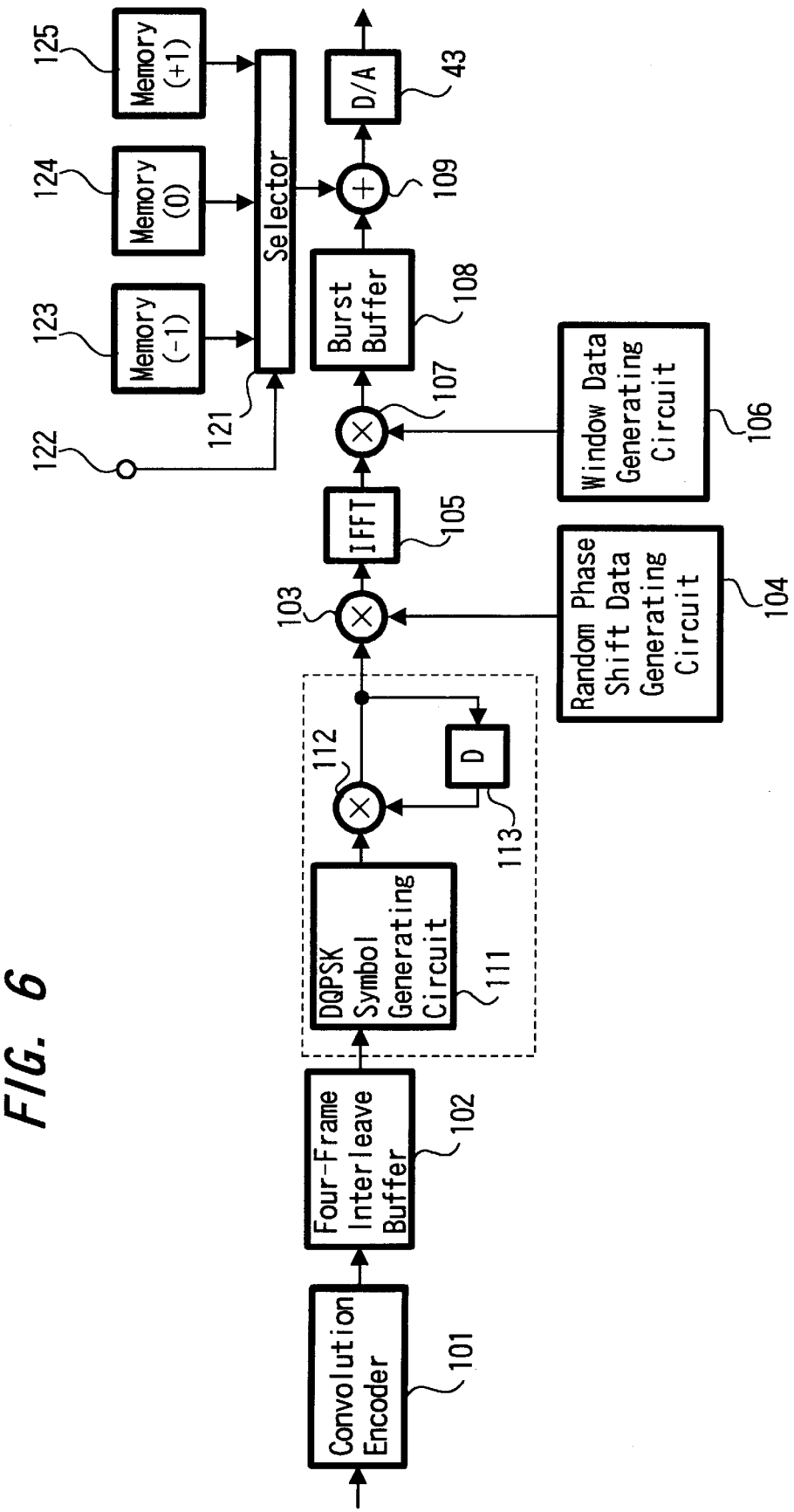
FIG. 6 is a block diagram showing an arrangement of an encoder of the terminal apparatus according to the embodiment.
Figure 7:
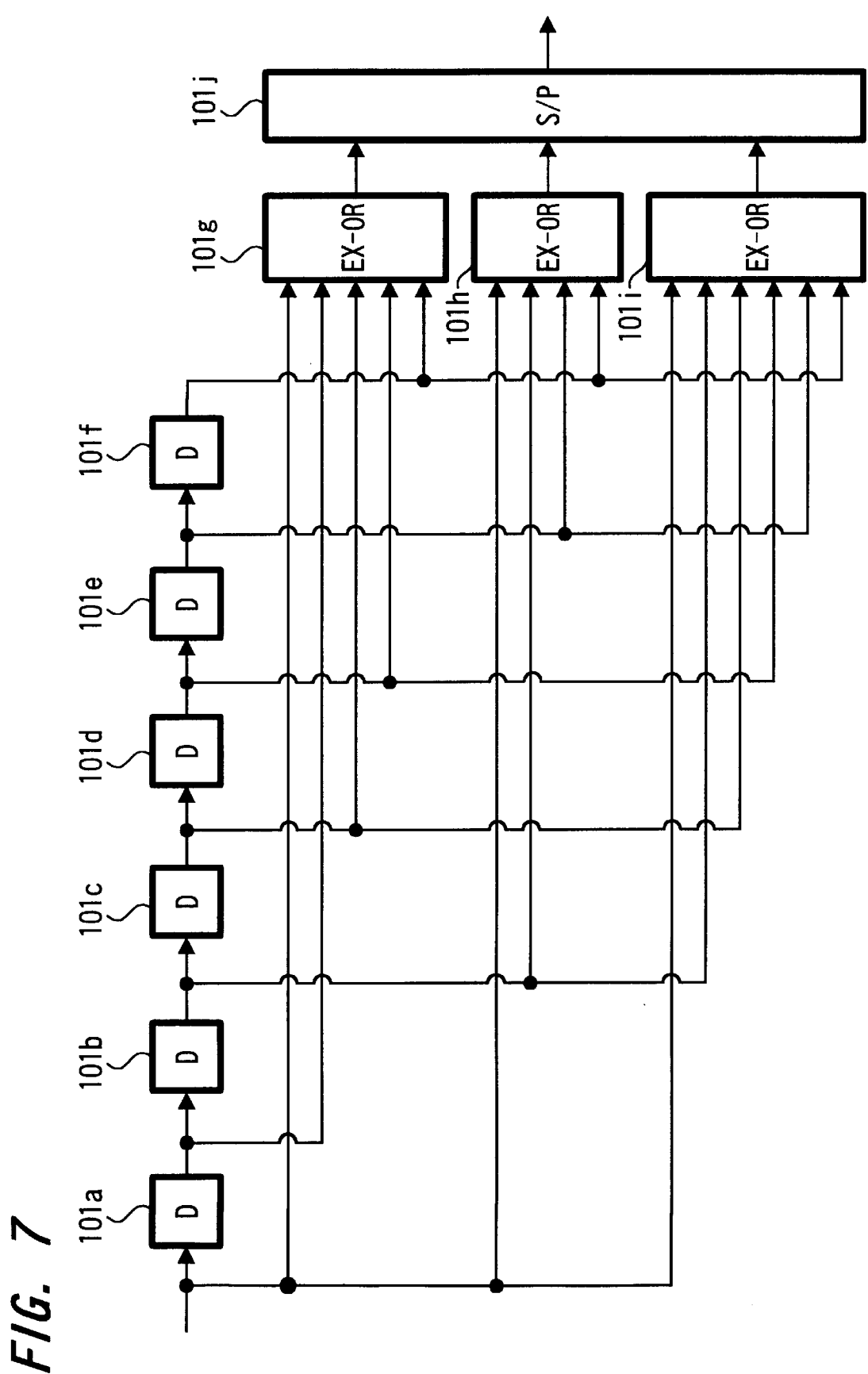
FIG. 7 is a block diagram showing an arrangement of a convolutional encoder of the terminal apparatus according to the embodiment.

Next, the encoder in the transmission system of the terminal apparatus of the arrangement and its peripheral arrangement will be described in detail with reference to FIG. 6. A convolution encoder 101 subjects a transmission data to convolution encoding. The convolution encoding is carried out with a constrained length of k=7 and a coding rate of R=1/3, for example. FIG. 7 is a diagram showing an arrangement of the convolution encoder with a constrained length of k=7 and a coding rate of R=1/3. Input data is supplied to six delay circuits 101a, 101b, . . . , 111f which are connected in series so that data of continuous seven bits are made coincident in their timing. Ex-OR gate 101g, 101h, 101i take an exclusive-OR of a predetermined data of the seven bits and outputs of the respective Ex-OR gates 101g, 101h, 101i are converted into parallel data by a serial-to-parallel converting circuit 101j, whereby convolution-encoded data is obtained.

FIG. 6 is again described. An output of the convolution encoder 101 is supplied to a four-frame interleave buffer 102 in which data interleave is carried out over four frames (20 msec.). An output of the interleave buffer 102 is supplied to a DQPSK encoder 110 in which a DQPSK modulation is carried out. That is, a DQPSK symbol generating circuit 111 generates a corresponding symbol based on supplied data, and then the symbol is supplied to a multiplier 112 at one input terminal thereof. A delay circuit 113 delays a multiplied output of the multiplier 112 by one symbol amount and returns it to the other input terminal thereof, whereby the DQPSK modulation is carried out. The DQPSK modulated data is supplied to a multiplier 103 so that random phase shift data output from a random phase shift data generating circuit 104 is multiplied with the modulated data, whereby phase of the data is apparently changed at random.

An output of the multiplier 103 is supplied to an inverse fast Fourier transformation (IFFT) circuit 105 in which a conversion processing to a time axis is carried out on the data of the frequency axis by calculation of the inverse fast Fourier transformation, whereby data on the real time axis of the multicarrier signal of 22 subcarriers with an interval of 6.25 kHz is produced. The IFFT circuit 105 for carrying out the inverse fast Fourier transformation enables an arrangement for generating subcarriers of a second powered number relatively easily. The IFFT circuit 105 employed in the present example is capable of generating $2^5$ subcarriers, i.e., 32 subcarriers and outputs data modulated into continuous 22 subcarriers of the generated subcarriers. The modulation rate of transmission data dealt by the IFFT circuit 105 of the present example is set to 200 kHz. A signal of a modulation rate of 200 kHz is converted into thirty-two multicarriers to produce multicarrier signals with an interval of 6.25 kHz, which numeral derives from calculation of 200 kHz÷32= 6.25 kHz.

Figures 8A, 8B:
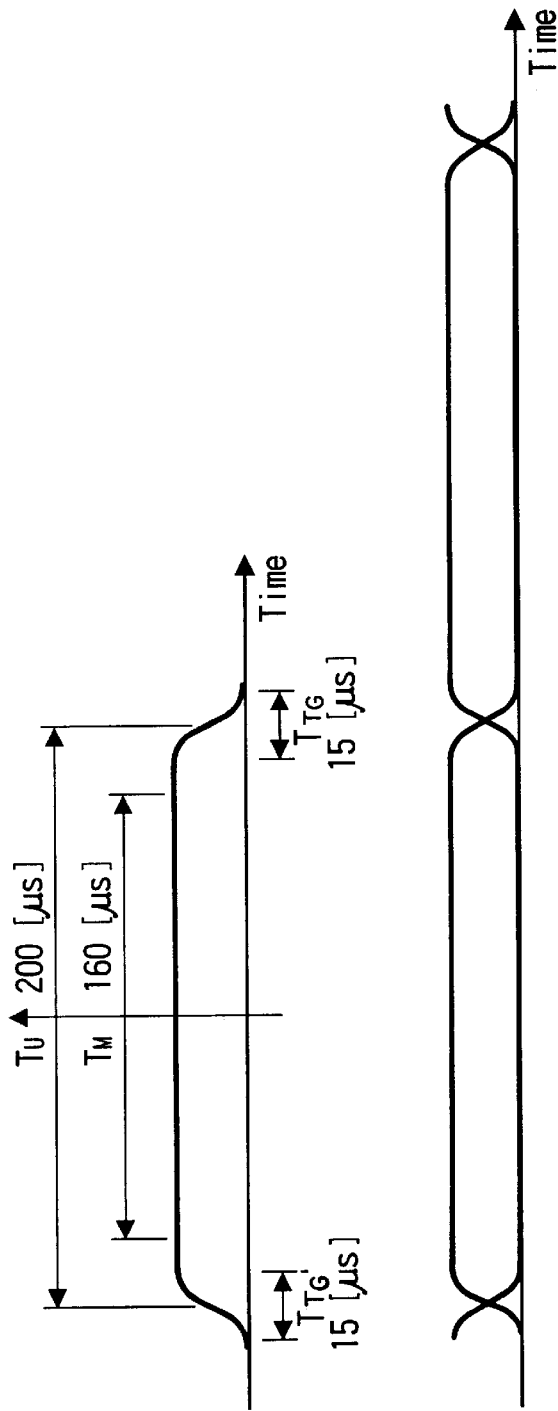
FIGS. 8A and 8B are diagrams showing examples of waveforms of a windowing data according to the embodiment.

The multicarrier data transformed into data of the real time by the inverse fast Fourier transformation is supplied to a multiplier 107 in which the data is multiplied with a time waveform output from a windowing data generating circuit 106. The time waveform is a waveform having one waveform length $T_u$, or about 200 μsec. (that is, one time slot period) as shown in FIG. 8A, for example, on the transmission side. However, the waveform is arranged to have its both end portions $T_{TR}$ (about 15 μsec.) changing gently in its waveform level. Hence, the neighboring time waveforms are arranged to overlap partly on each other as shown at FIG. 8B when the time waveform is utilized for multiplication.

In a windowing data according to this embodiment shown in FIG. 8A, a last predetermined period $T_G$ of a length $T_U$ of one unit during one time slot period is set as a guard time, during which no information is transmitted. A predetermined head period $T_G'$ of a length $T_U$ of one unit has the same waveform as that of the guard time period $T_G$. Upon reception, a center portion $T_M$ other than the periods $T_G$ and $T_G'$ is extracted to carry out the demodulation processing.

FIG. 6 is again described. The signal multiplied with the time waveform by the multiplier 107 is supplied through a burst buffer 108 to an adder 109. The adder 109 adds control data output from a control data selector 121 to the signal at a predetermined position. The control data utilized for addition is control data indicating control of transmission output. Based on a result of determination over the condition of the received signal at a terminal 122, the selector 121 sets the control data.

In this case, the selector 121 is connected with three control data memories 123, 124, 125 (actually, these memories may be provided by dividing an area of one memory into three portions). Control data for decreasing a transmission output (−1 data) is stored in the memory 123, control data for keeping the transmission output in an unchanged state (±0 data) is stored in the memory 124, and control data for increasing the transmission output (+1 data) is stored in the memory 125, respectively. The control data stored in this case is data equivalent to data when the corresponding control data is subjected to the modulation processing for transmission in the encoder up to the multiplier 107.

Figure 9:
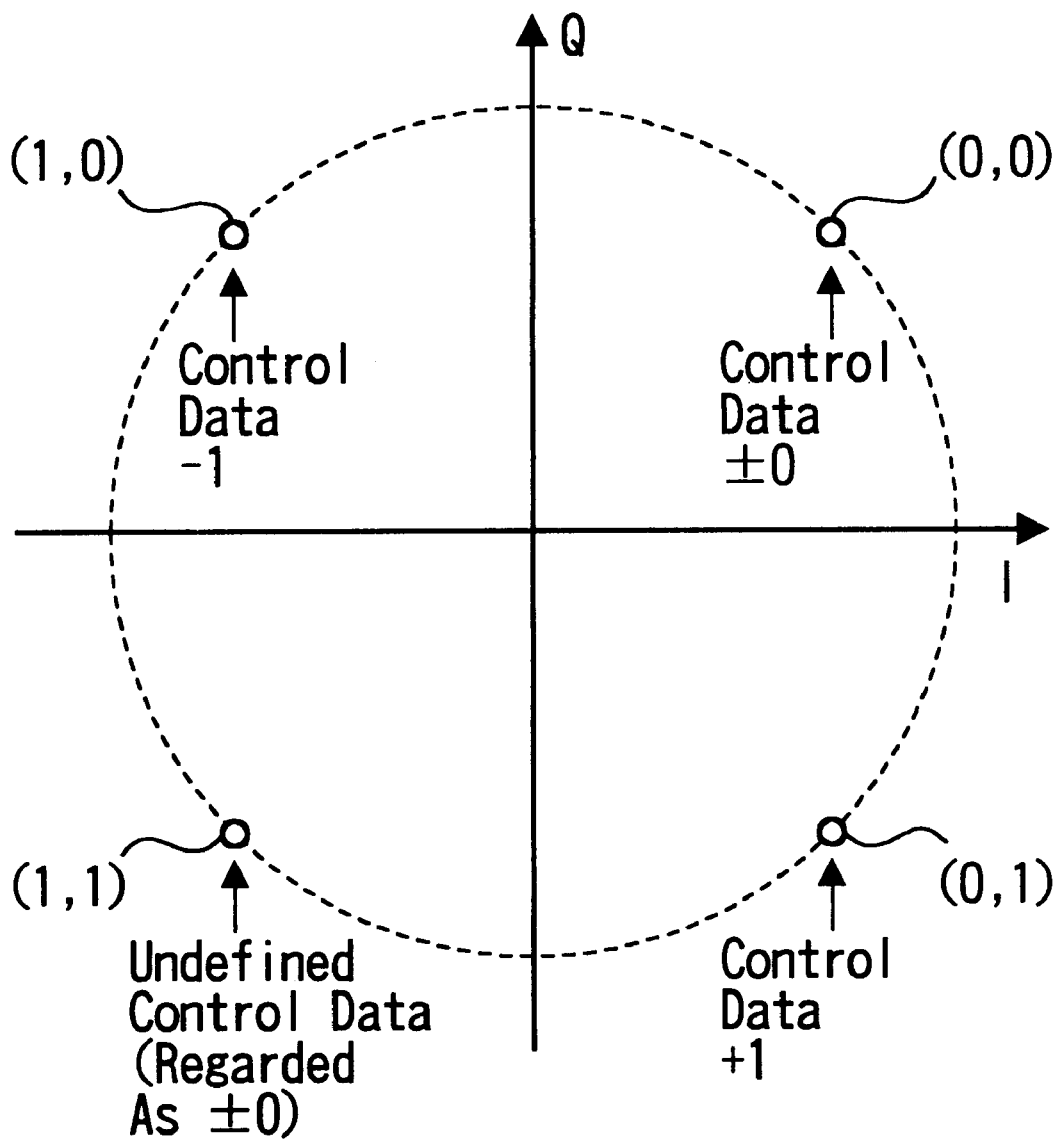
FIG. 9 is a phase characteristic graph showing an example of a transmission data according to the embodiment.

More concretely, the transmission data is a phase-modulated data changing on a plane formed by the I-axis and the Q-axis orthogonal to each other, i.e., the data changing along a circle on a plane shown in FIG. 9. Data (I, Q) at a position of (0, 0) is set to ±0 data, that at a position of (1, 0) behind from the position by 90 degrees is set to −1 data and that at a position of (0, 1) ahead of the position of ±0 data by 90 degrees is set to +1 data. Control data for the transmission output corresponding to a position of (1, 1) is undefined so that when the reception side discriminates the data of the position, the data is regarded as ±0 data to keep the transmission output unchanged. The signal phase shown in FIG. 9 is a phase before being modulated into multicarrier signals. Actually, the data of the signal phase is modulated into multicarrier signal and data generated by multiplied with a time waveform are stored in respective memories 123, 124, 125.

Transmission data added with the control data by the adder 109 is supplied to a digital-to-analog converter 43 (which corresponds to the digital-to-analog converters 43I, 43Q shown in FIG. 5) in which the transmission data is converted into an analog signal using a clock of 200 kHz for conversion.

Next, the decoder and the peripheral arrangement thereof of the reception system of the terminal apparatus of the present example will be described in detail with reference to FIG. 10. Digital data resulting from conversion by an analog-to-digital converter 20 (corresponding to the analog-to-digital converters 20I, 20Q in FIG. 5) using a clock of 200 kHz, is supplied through a burst buffer 131 to a multiplier 132, in which the digital data is multiplied with a time waveform output from an inverse windowing data generating circuit 133. The time waveform utilized for multiplication upon reception is a time waveform with a shape shown in FIG. 8A. This time waveform is arranged to have a length, $T_M$, i.e., 160 μsec. which is shorter than the length of the same upon transmission.

The reception data multiplied with the time waveform is supplied to a FFT circuit 134 in which conversion between a frequency axis and a timebase is carried out by the fast Fourier transformation processing, whereby the transmitted data modulated into twenty-two subcarriers with an interval of 6.25 kHz and arranged on the time base are separated into and information component which each carrier has. The conversion processing in this case is carried out by a circuit capable of processing subcarriers of $2_5$, i.e., thirty-two subcarriers, similarly to the case in which conversion processing is carried out by the IFFT circuit in the transmission system. Data modulated into continuous twenty-two subcarriers are converted and output therefrom. The modulation rate of transmission data dealt by the FFT circuit 134 of the present example is set to 200 kHz. Since the circuit is capable of processing thirty-two multicarriers, conversion processing can be carried out on multicarriers with an interval of 6.25 kHz, which numeral derives from calculation of 200 kHz÷32=6.25 kHz.

The reception data which has been subjected to the fast Fourier transformation in the FFT circuit 134 is supplied to a multiplier 135, in which the reception data is multiplied with inverse random phase shift data (this data is data changing in synchronism with random phase shift data on the transmission side) output from an inverse random phase shift data generating circuit 136, whereby the data is restored to have its original phase.

The data restored to have its original phase is supplied to a differential demodulation circuit 137 in which the data is subjected to differential demodulation. The differentially demodulated data is supplied to a four-frame deinterleave buffer 138 in which data interleaved over four frames upon transmission is restored to have its original data order. The deinterleaved data is supplied to a Viterbi decoder 139 in which the data is Viterbi-decoded. The Viterbi-decoded data is supplied as decoded reception data to a reception data processing circuit (not shown) placed in the later stage.

An arrangement for detecting a timing synchronized with the reception signal by the terminal apparatus will be described with reference to FIG. 11. An analog/digital converter 20 (equivalent to the A/D converters 20I, 20Q shown in FIG. 5) samples the data and supplies to a delay circuit 171. The delay circuit 171 is a circuit for delaying a signal by a time corresponding to the period $T_M$ except the guard time in one slot period (see FIG. 8A) (i.e., 160 $\mu$s). A signal delayed by the delay circuit 171 and a signal which is not delayed are supplied to a multiplier 172 for detecting a correlation value.

The multiplier 172 supplies a correlation detection data to a moving average calculating circuit 173. The circuit 173 calculates a moving average value and supplies a squaring circuit 174. The squaring circuit 174 squares the mean value and makes it as an absolute value. A value output from the squaring circuit 174 is supplied to one addition input of an adder 175. The adder 175 is supplied at the other addition input with the addition output through a delay circuit 176. The delay circuit 176 is a circuit for delaying a signal by 200 $\mu$s equivalent to a time waveform Tu of one slot period. The adder 175 adds a signal with an output delayed by one slot period, thereby obtaining a signal accumulated in a slot period. An output of the adder 175 is supplied to a peak position determining circuit 177 for determining a peak position thereof.

An operation state of the circuit shown in FIG. 11 will be described with reference to FIGS. 12A to 12E which are diagrams showing waveforms. As shown in FIG. 12A, a waveform of a reception signal is that of a continuous signal, and hence it is difficult to detect a timing therefrom as it is. If the multiplier 172 detects a correlation, since the last guard time $T_G$ of one time slot period has high correlation with the head guard time period $T_G'$ of the one time slot period, as shown in FIG. 12B, high correlation is detected at the guard time $T_G$ and hence a signal level thereat becomes slightly high. In this state, it is possible to roughly determine a position of the guard time period $T_G$, but since it is a data of a complex number, a phase of a signal is uncertain and hence it is difficult to determine a precise position thereof.

If the moving average calculating circuit 173 calculates the moving average, then the guard time $T_G$ is partially integrated as shown in FIG. 12C and a waveform of the signal becomes one having peaks at the boundary portions of time slots. However, the peak is not clear. In this state, since it is a data of a complex number, a phase of a signal is uncertain and hence it is difficult to determine a precise position thereof. Then, when the squaring circuit 174 squares the moving average value and makes it as an absolute value, the waveform becomes as shown in FIG. 12D. At this time, although the data is not a complex number and a phase becomes certain, a noise level is still large in this state and hence the peak position is not clear.

In this embodiment, since an accumulating circuit formed of the adder 175 and the delay circuit 176 accumulates the squared average value at one time slot period shwon in FIG. 12E, peak values $P_1$, $P_2$, $P_3$, $P_4$, . . . are accumulated and hence gradually become higher, which clarifies the peak positions. Therefore, it is very easy for the peak position determining circuit 177 to discriminate the peak position. Then, the peak position discriminated by the peak position determining circuit 177 is employed as the sync data of the time slot, and a sampling timing of the reception data and so on are determined by using the data.

Figure 11:
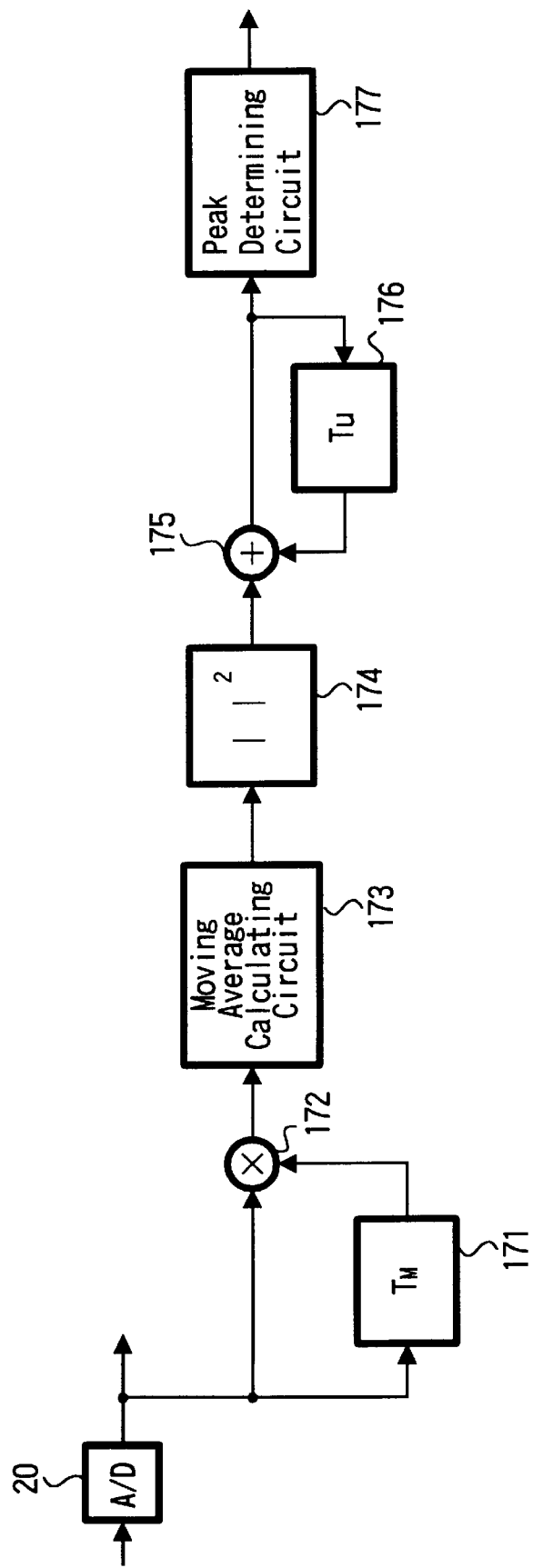
FIG. 11 is a block diagram showing an arrangement for timing detecting processing of the terminal apparatus according to the embodiment.
Figure 12:
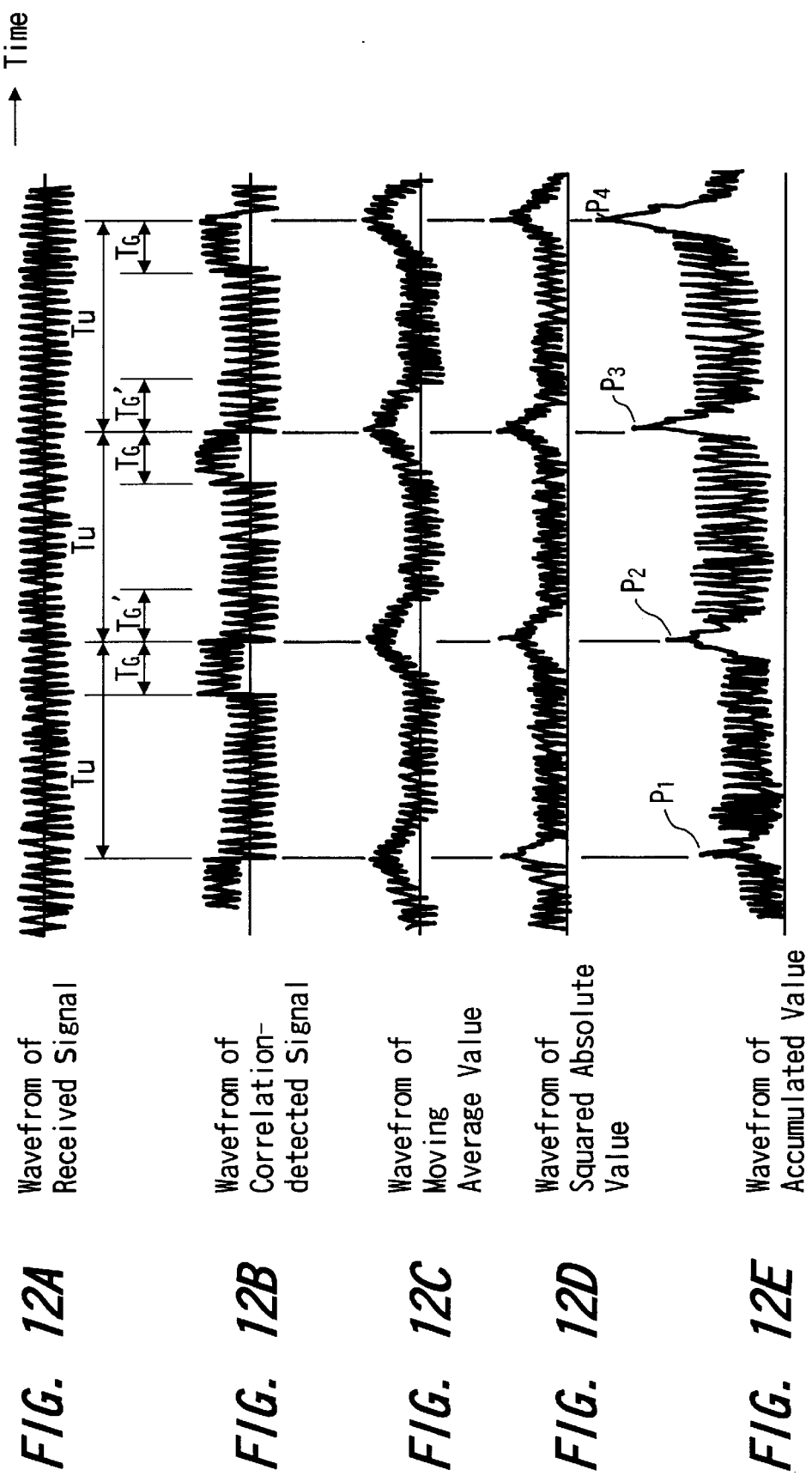
FIGS. 12A to 12E are diagrams of waveforms used to explain the timing detecting processing according to the embodiment.

While a value accumulated in the circuit shown in FIG. 11 becomes gradually higher through continuous accumulation, the value may be reset at every predetermined period (e.g., one frame period) to repeat accumulation.

While the delay circuit 171 for detecting the correlation delays a signal by only the period $T_M$ except the guard times to detect the correlation between the guard time periods $T_G$ and $T_G'$ of the adjacent two time slots, the signal may be delayed by one slot period to detect correlation between the guard time periods $T_G$ of the two adjacent time slots.

Figure 13:
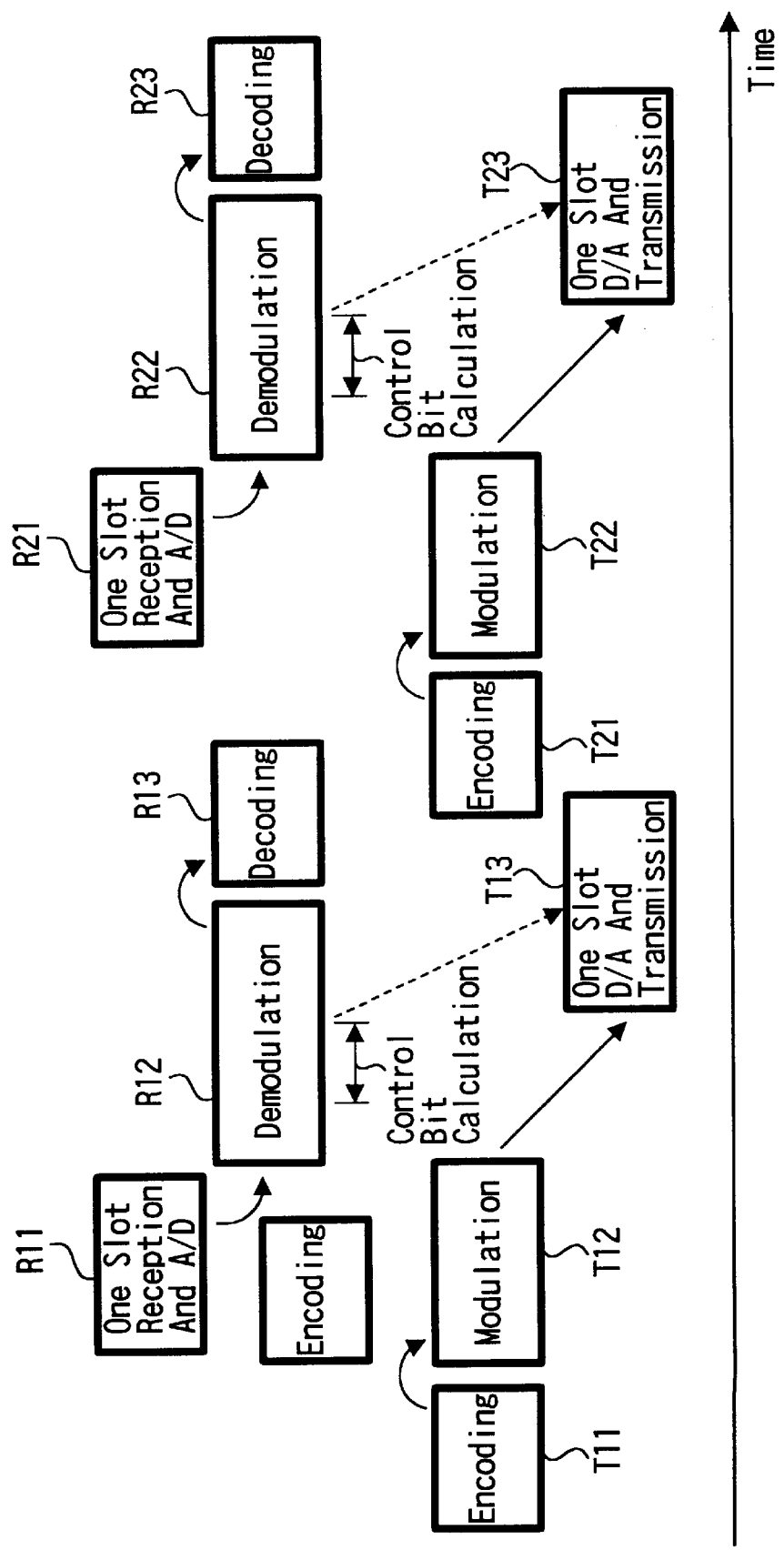
FIG. 13 is a timing chart showing a processing timing according to the embodiment.

FIG. 13 shows timings of processings of the terminal apparatus described so far. Initially, data of one time slot is received at timing R11 in the reception system, and simultaneously with the reception, the received data is converted into digital data by the analog-to-digital converter 20 and then stored in the burst buffer 131. The stored reception data is subjected to demodulation processings such as multiplication with the time waveform, the fast Fourier transform, multiplication with the inverse random phase shift data, differential demodulation, Viterbi demodulation and so on at the next timing R12. Thereafter, decoding is carried out by data processing at the next timing R13.

Then, from timing R21 which is six time slots after timing R11, to timing R23, a processing the same as that of timing R11 to R13 is carried out. Thereafter, the same processing is repeated.

In the transmission system, transmission is carried out at a timing shifted by three time slots with respect to the timing of reception. That is, the transmission data is encoded at predetermined timing T11, the encoded data is subjected to a modulation processing by which the data is converted into transmission data of one burst amount at the next timing T12, and the data is once stored in the burst buffer 108 of the transmission system. Then, at timing T13 behind three time slots from the reception timing R11 the transmission data stored in the burst buffer 108 is converted by the digital-to-analog converter 43 and then subjected to transmission processing and transmitted from the antenna 11. Then, from timing T21, which is six time slots after timing T11, to timing T23 a processing the same as that of timing T11 to T13 is carried out. Thereafter, the same processing is repeated.

In this way, reception processing and transmission processing are carried out intermittently in a time sharing manner. In the present example, control data (control bit) of the transmission output to be added to transmission data, i.e., the control data of the transmission output up on transmission as described with reference to FIG. 6, is added by the adder 109 at the last timing when the encode processing is completed for transmission. Therefore, the state of the reception data can be swiftly reflected upon the control data to be transmitted. That is, for example, reception state of the burst signal received at timing R11 is detected in a midst of demodulation at timing R12, and the control state of the transmission output to be notified to the opponent of communication (base station) is determined (i.e., FIG. 11 shows a processing at a timing indicating control bit calculation). When the control bit is calculated, the result of calculation is sent from the terminal 122 to the selector 121, in which the calculation result is added with control data corresponding to transmission data stored in the burst buffer 108, and a burst signal to be transmitted at timing T13 is added with control data of transmission output based on the last received data indicative of the state.

The opponent carrying out communication (base station) determines the control data transmitted at timing T13 so that the opponent controls the transmission output into the corresponding state when the burst signal is transmitted from the base station at the next timing R21. Consequently, the burst signal to be transmitted next is controlled in its transmission output on the basis of the reception state of the burst signal which has been transmitted in the preceding cycle. Thus, the transmission output is positively controlled at every one cycle when the burst signal is transmitted, and hence it is possible to provide substantially uniform transmission outputs of transmission signals transmitted through a plurality of paths between the terminal apparatus and one base station at the same time.

Figure 10:
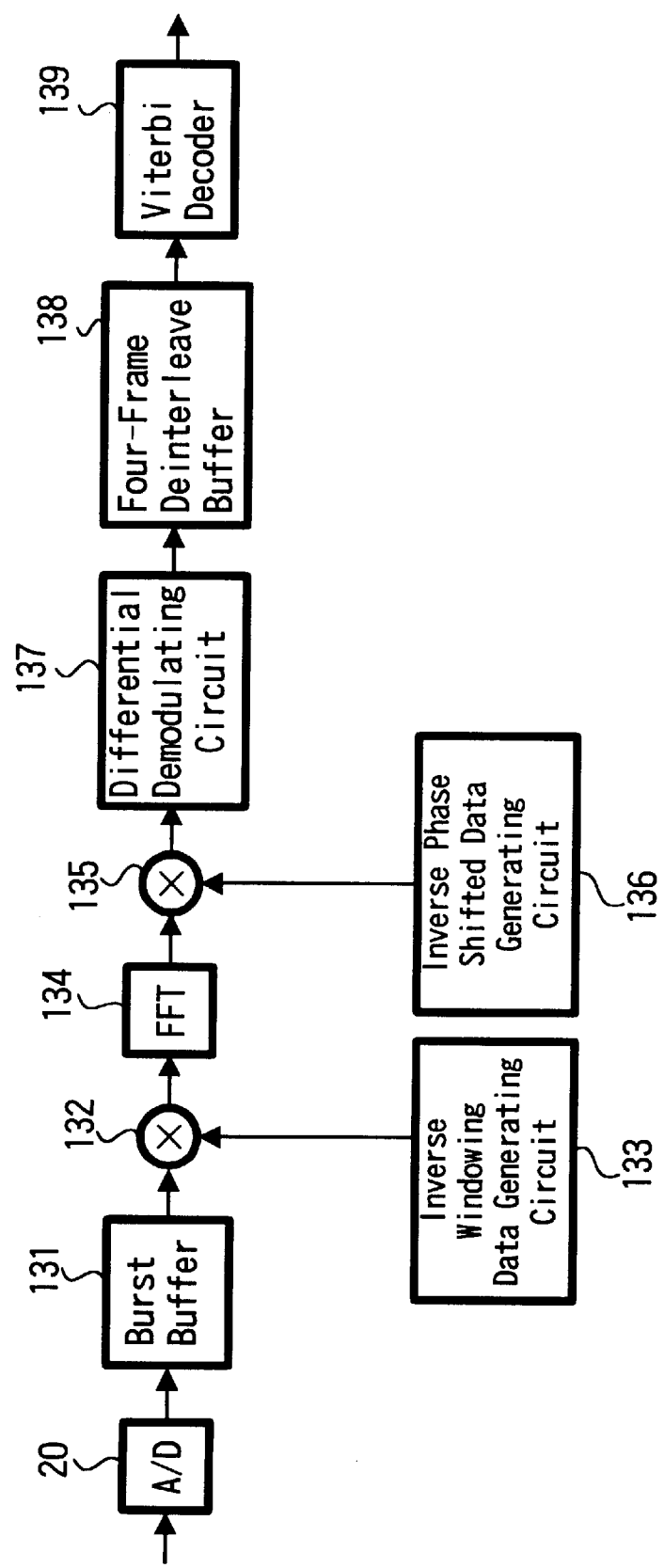
FIG. 10 is a block diagram showing an arrangement of a decoder of the terminal apparatus according to the embodiment.

If it is not carried out in the processing that, as in the present example, the control data of the transmission output is prepared in the memory in advance to carry out adding processing, then the following consequence will happen in the system of FIG. 10, for example. That is, a result received at timing R11 is determined in the process of demodulation at timing R12, thereafter the control data is encoded at timing T21 and demodulated at timing T22, and the control data based on the reception result at timing R11 is transmitted in response to the burst signal transmitted at timing T23. Thus, it is impossible to control the transmission output at every cycle. While description has been made on a case in which the terminal apparatus side generates data useful for controlling the transmission output from the base station, it is needless to say that the base station side may also generate data useful for controlling the transmission output from the terminal apparatus.

Moreover, values of the frequencies, time, coding rates and so on are described in this embodiment by way of example, and hence the present invention is not limited to the above embodiment. It is needless to say that the present invention can be applied to the modulation processing other than the DQPSK modulation in view of the modulation system.

While the processing for detecting the synchronization timing of the reception data as described in the above embodiment is applied to the terminal apparatus in this embodiment, the present invention is not limited thereto. It is needless to say that the processing can be applied to the processing for synchronizing the timing of the base station side with the signal from the terminal apparatus.

According to the present invention, it becomes possible to easily detect the guard time period of the multicarrier signal to be transmitted from the peak position thereof, and it is possible to precisely detect the timing serving as the reference of the multicarrier signal with a simple processing. Therefore, it becomes possible to carry out the reception processing with the precise timing based on the detected reference timing. In this case, since in the processing only the guard time period of the transmission signal is detected, it is not necessary to detect the sync bit and so on, and it is not necessary to transmit the signal added with the sync bit used for detecting the timing. Hence, it is possible to carry out the transmission with a satisfactory transmission efficiency to that extent.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A receiving method for receiving, demodulating and decoding an input signal synchronized with a multicarrier signal having guard times, each carrier having the same waveform, comprising:
   a correlation detecting step of detecting correlation of a demodulated signal in a time domain;
   a mean value calculating step of calculating a mean value of a correlated value detected in said correlation detecting step;
   an accumulating step of accumulating mean values found in said mean value calculating step;
   a peak detecting step of detecting a peak value of an accumulated value obtained in said accumulating step and producing a corresponding output signal;
   a timing signal generating step of generating a timing signal by using the output signal produced in said peak detecting step; and
   a decoding step of decoding the input signal by using said timing signal.

2. The reception method according to claim 1, wherein said correlation detecting step includes the step of detecting a correlation value per unit time which is a time of a data portion except a guard time portion of said multicarrier signal.

3. The reception method according to claim 1, wherein said correlation detecting step includes the step of detecting a correlation value per unit time which is a sum of a time of a data portion and a guard time portion of said multicarrier signal.

4. The reception method according to claim 1, wherein said mean value calculating step includes the steps of calculating and squaring said mean value.

5. The reception method according to claim 1, wherein said accumulating step includes the step of detecting a signal per unit time which is a sum of a time of a data portion and a guard time portion of said multicarrier signal.

6. The reception method according to claim 1, including the further step of rolling over said accumulated value in every predetermined period.

7. A synchronizing method for generating a synchronization signal by receiving a multicarrier signal having guard times, each carrier having the same waveform, comprising:
   a correlation detecting step of detecting correlation of a demodulated signal in a time domain;
   a mean value calculating step of calculating a mean value of correlated values detected in said correlation detecting step and squaring said mean value;

an accumulating step of accumulating mean values found in said mean value calculating step;

a peak detecting step of detecting a peak value of an accumulated value obtained in said accumulating step and producing a corresponding output signal;

a timing signal generating step of generating a timing signal by using the output signal produced in said peak detecting step; and a decoding step of decoding said multicarrier signal by using said timing signal.

8. The synchronization method according to claim 7, wherein said correlation detecting step includes the step of detecting a correlation value per unit time which is a time of a data portion except a guard time portion of said multicarrier signal.

9. The synchronizing method according to claim 7, wherein said correlation detecting step includes the step of detecting a correlation value per unit time which is a sum of a time of a data portion and a guard time portion of said multicarrier signal.

10. The synchronizing method according to claim 7, wherein said accumulating step includes the step of detecting a signal per unit time which is a sum of a time of a data portion and a guard time portion of said multicarrier signal.

11. The synchronizing method according to claim 10, including the further step of resetting said accumulated value in every predetermined period.

12. A receiving apparatus for receiving, demodulating and decoding a signal synchronized with a multicarrier signal having guard times, each carrier having the same waveform, comprising:

radio frequency signal processing means for processing a received RF signal;

demodulating means for demodulating an output signal from said radio frequency signal processing means;

correlation detecting means for detecting correlation of a signal output from said demodulating means in a time domain;

mean value calculating means for calculating a mean value of a signal output from said correlation detecting means;

accumulating means for accumulating an output signal from said mean value calculating means;

peak detecting means for detecting a peak value of an output signal from said accumulating means;

timing signal generating means for generating a timing signal by using an output signal of said peak detecting means; and decoding means for decoding a signal by using said timing signal.

13. The receiving apparatus according to claim 12, wherein said correlation detecting means detects a correlation value per unit time which is a time of a data portion excluding a guard time portion of said multicarrier signal.

14. The receiving apparatus according to claim 12, wherein said correlation detecting means detects a correlation value per unit time which is a sum of a time of a data portion and a guard time portion of said multicarrier signal.

15. The receiving apparatus according to claim 12, wherein said mean value calculating means includes means for calculating and squaring said mean value.

16. The receiving apparatus according to claim 12, wherein said accumulating means accumulates a signal per unit time which is a sum of a time of a data portion and a guard time portion of said multicarrier signal.

17. The receiving apparatus according to claim 16, wherein said accumulating means rolls over an output value thereof in every predetermined period.

18. A synchronizing apparatus for generating a synchronization signal by receiving a multicarrier signal having guard times, each carrier having the same waveform, comprising:

radio frequency signal processing means for processing a received RF signal;

demodulating means for demodulating an output signal from said radio frequency signal processing means;

correlation detecting means for detecting correlation of a signal output from said demodulating means in a time domain;

mean value calculating means for calculating a mean value of a signal output from said correlation detecting means and squaring said mean value;

accumulating means for accumulating an output signal from said mean value calculating means;

peak detecting means for detecting a peak value of an output signal from said accumulating means;

timing signal generating means for generating a timing signal by using an output signal of said peak detecting means; and decoding means for decoding a signal by using said timing signal.

19. The synchronizing apparatus according to claim 18, wherein said correlation detecting means detects a correlation value per unit time which is a time of a data portion excluding a guard time portion of said multicarrier signal.

20. The synchronizing apparatus for according to claim 18, wherein said correlation detecting means detects a correlation value per unit time which is a sum of a time of a data portion and a guard time portion of said multicarrier signal.

21. The synchronizing apparatus according to claim 18, wherein said accumulating means accumulates a signal per unit time which is a sum of a time of a data portion and a guard time portion of said multicarrier signal.

22. The synchronizing apparatus according to claim 21, wherein said accumulating means rolls over an output value thereof in every predetermined period.

* * * * *